(12) United States Patent
Abiko et al.

(10) Patent No.: US 6,194,046 B1
(45) Date of Patent: Feb. 27, 2001

(54) OPTICAL RECORDING MEDIUM AND MANUFACTURING METHOD THEREOF

(75) Inventors: Toru Abiko; Kazutomo Miyata, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/244,200

(22) Filed: Feb. 4, 1999

(30) Foreign Application Priority Data

Feb. 10, 1998 (JP) .................................................. 10-028677

(51) Int. Cl.$^7$ ...................................................... B32B 3/02
(52) U.S. Cl. ...................... 428/64.1; 428/64.4; 428/64.5; 428/64.6; 428/913; 430/270.13; 430/495.1; 430/945; 369/283; 369/288
(58) Field of Search .................................. 428/64.1, 64.2, 428/64.4, 64.5, 64.6, 913; 430/270.13, 495.1, 945; 369/283, 288

(56) References Cited

U.S. PATENT DOCUMENTS 5,948,496 * 9/1999 Kinoshita ............................ 428/64.1

FOREIGN PATENT DOCUMENTS 0 201 860 A2    5/1986  (EP) .

OTHER PUBLICATIONS

Patent Abstracts of Japan Application No. 62317034 dated Dec. 15, 1987.
Patent Abstracts of Japan Application No. 05236891 dated Sep. 22, 1993.
Patent Abstracts of Japan Application No. 60034754 dated Feb. 22, 1985.

* cited by examiner

Primary Examiner—Elizabeth Evans
(74) Attorney, Agent, or Firm—Sonnenschein, Nath & Rosenthal

(57) ABSTRACT

An optical recording medium having sufficient repetition recording durability and its manufacturing method. A first dielectric layer 2 is layered on a major surface 1a of a substrate 1, and a recording layer 5, made up of two layers, namely a first thin film 3 and a second thin film 4 having different crystallization start temperatures, is formed on the first dielectric layer 2. A second dielectric layer 6, a reflective layer 7 and a protective layer 8 are then sequentially formed. One of the first thin film 3 or the second thin film 4 preferably contains nitrogen or oxygen. It is more desirable that the first thin film 3 lying towards the substrate 1 contains nitrogen or oxygen. The difference between the crystallization start temperature of the first thin film 3 and that of the second thin film 4 be 20° C. or more. It is more desirable that the crystallization start temperature of the first thin film 3 lying towards the substrate 1 be higher by 20° C. or more than that of the second thin film 4. The thicknesses of the first thin film 3 and the second thin film 4 are desirably each 3 nm or more.

7 Claims, 3 Drawing Sheets

OPTICAL RECORDING MEDIUM AND MANUFACTURING METHOD THEREOF

RELATED APPLICATION DATA

The present application claims priority to Japanese Application No. P10 028677 filed Feb. 10, 1998 which application is incorporated herein by reference to the extent permitted by law.

BACKGROUND OF THE INVENTION

1. Field of the Invention

This invention relates to an optical recording medium and a manufacturing method thereof. More particularly, it relates to an optical recording medium a recording layer of which is heated by illumination of light, such as laser light, to raise its temperature to produce phase change therein to record or erase the information to optically read out information signals, and a manufacturing method thereof.

2. Description of the Related Art

In the field of data recording, investigations into the optical data recording system are proceeding briskly. This optical data recording system has a number of advantages, such as non-contact recording/reproduction, a recording density higher by one digit of magnitude than in the magnetic recording system, and adaptability to memory configurations such as read-only, write-once or overwrite memory configurations, and is finding a wide field of application ranging from the industrial usage to the domestic usage as a system enabling realization of an inexpensive large-capacity file.

The optical data recording system, adapted for the overwrite memory configuration, may be enumerated by a magneto-optical disc and a phase-change optical disc.

The phase change optical disc, associated with the overwrite memory configuration, has the following structure: That is, a transparent dielectric film of ZnS etc is formed on a major surface of a transparent substrate, and subsequently a phase-change recording film of ZnS etc and a reflective film, such as an aluminum film, are formed thereon.

The chalcogen-based alloy material may be enumerated by a Ge—The—, Ge—The—Sb—, In—Sb—The— or Ge—S—Te-based materials. These materials permit information recording/erasure by exploiting transition between the crystal-amorphous and crystal-crystal phases. Of these materials, those having a specified composition of the Ge—Sb—Te-based material, as disclosed in JP Patent Kokai JP-A-62-53886, 3-80635 and 63-225934 and in JP Patent Kokoku JP-B-8-32482, or those having a specified composition of the Ag—In—Sb—Te-based material, as disclosed in JP Patent Kokai JP-A-6-166268 and 4-232779, are well-known.
[0006]

When recording the information on the phase-change optical disc, the light, such as the laser light, is illuminated from the transparent substrate side on the phase-change recording film to raise its temperature in a spot fashion to change the state of a portion of the phase-change recording film to effect the recording. The above-mentioned material is amorphous on rapid heating or quenching, and is crystallized on gradual cooling, depending on the heating temperature. Thus, the information is recorded by forming an amorphous portion and a crystalline portion.

For reproducing the information from the phase-change optical disc, the laser light, for example, which will not produce changes in the phase-change recording film, is illuminated to the phase-change recording film, from the side of the transparent substrate, to detect the information depending on the difference between the return light from the crystalline portion and that from the amorphous portion.

Meanwhile, the above-mentioned phase-change optical disc cannot be said to be sufficient in signal properties or recording durability for high linear velocity and for high recording density, such that the properties of the phase-change optical disc need to be improved further.

Also, the phase-change optical disc is adapted to the overwrite memory configuration, so that the phase-change optical disc is to be improved further in recording/erasure characteristics and in repetition durability.

SUMMARY OF THE INVENTION

It is therefore an object of the present invention to provide an optical recording medium having sufficient signal characteristics and recording durability in high linear velocity and in recording density, and also having sufficient repetition recording durability as well as sufficient recording/erasure and repetition characteristics particularly required as the overwrite memory.

It is another object of the present invention to provide a manufacturing method for this type of the optical recording medium.

In one aspect, the present invention provides an optical recording medium in which at least a first dielectric layer, a recording layer, a second dielectric layer and a reflective layer are layered on a substrate, and in which the recording layer is reversibly changed from a crystalline state to an amorphous state or vice versa to record or erase the information, wherein the recording layer is made up of two thin films having different crystallization start temperatures.

The crystallization start temperature is now explained with reference to FIG. 5 showing the relation between the time and the temperature. In FIG. 5, the abscissa denotes time, the ordinate denotes the temperature and the reflectivity level, a broken line denotes the state of temperature changes and a solid line denotes the state of reflectivity level changes. The crystallization start temperature is the temperature $T_1$ corresponding to a point $R_1$ at which the reflectivity level is abruptly changed at the time of transition from the amorphous state to the crystalline state.

A specified example of the two thin films making up the recording layer is a phase-change recording film formed of, for example, chalcogen-based alloy materials. The chalcogen-based alloy materials maybe enumerated by Ge—Te—, Ge—Te—Sb—, In—Sb—Te— and Ge—Sn—Te-based materials. Most preferred is the Ag—In—Sb—Te-based material.

In the optical recording medium of the present invention, one of the two thin films making up the recording layer preferably contains nitrogen or oxygen.

In producing the optical recording medium according to the present invention, the recording layer made up of two thin films may be formed by sputtering under an atmosphere of argon containing not more than 15% of nitrogen or under an atmosphere containing not more than 15% of oxygen.

Also, in the optical recording medium of the present invention, it is more preferred for the substrate side thin film of the recording layer to contain nitrogen or oxygen. In producing this optical recording medium, it is also more preferred for the crystallization start temperature of the substrate side thin film of the recording layer to be higher by not less than 20° C. than that of the opposite side thin film.

Moreover, in the optical recording medium of the present invention, the two thin films of the recording layer are preferably of a thickness not less than 3 nm.

In the optical recording medium of the present invention, in which the recording layer, adapted for recording or erasing the information by reversibly changing the recording layer from the crystalline state to the amorphous state or vice versa, is made up of two thin films having different crystallization start temperatures, the recording/erasure characteristics can be assured by the thin film of higher crystallization start temperature, while the repetition durability can be assured by the thin film of lower crystallization start temperature. This reciprocal effect assures optimum repetition recording durability.

DESCRIPTION OF THE PREFERRED EMBODIMENTS

Figure 1:
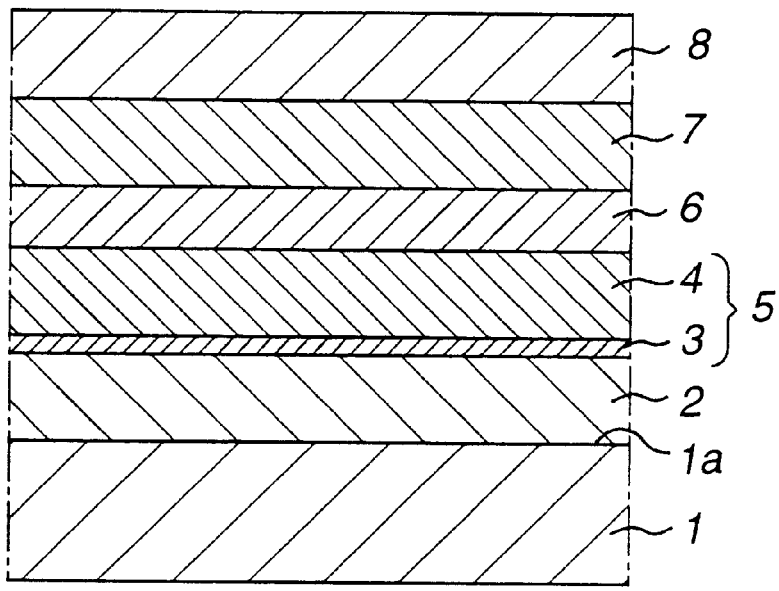
FIG. 1 is a schematic cross-sectional view showing a structure of an optical recording medium embodying the present invention.

Referring to the drawings, preferred embodiments of the present invention will be explained in detail. It is noted that the present invention is applied herein to an optical disc and its manufacturing method.

An optical disc of the present embodiment has the following structure. That is, a first dielectric layer 2 is formed on a major surface 1a of a disc-shaped substrate 1, and a recording layer 5 comprised of a first thin film 3 and a second thin film 4 having different crystallization start temperatures is layered thereon. On this recording layer 5 are further formed a second dielectric layer 6, a reflective layer 7 and a protective layer 8 in this order.

The substrate 1 used is formed of, for example, polycarbonate or glass, capable of transmitting the laser light therethrough. The first dielectric layer 2 and the second dielectric layer 6 are preferably formed of a material containing at least ZnS, for example, a material comprised of ZnS—SiO$_2$. The reflecting layer 7 may be formed of, for example, aluminum, while the protective layer 8 may be formed of, for example, a UV curable resin.

In the optical disc of the present embodiment, it is essential that the first thin film 3 and the second thin film 4 be two thin films of different crystallization start temperatures. The first thin film 3 and the second thin film 4 may be enumerated by phase-change recording films formed of, for example, chalcogenic alloy materials. Most preferred are Ag—In—Sb—Te based materials.

In the optical disc of the present embodiment, one of the first thin film 3 or the second thin film 4 making up the recording layer 5 preferably contains nitrogen or oxygen. It is more preferred for the first thin film 3 lying towards the substrate 1 to contain nitrogen or oxygen.

Also, in the optical disc of the present embodiment, the difference in the crystallization start temperatures of the first and second thin film 3 and 4 making up the recording layer 5 is preferably not less than 20° C. It is more preferred that the crystallization start temperature of the first thin film 3 towards the substrate 1 be higher by 20° C. or more than that of the opposite side second thin film 4.

In recording the information on the optical disc of the present embodiment, the laser light, for example, is illuminated from the substrate 1 towards the recording layer 5 to raise the temperature of the recording layer 5 in a spot fashion to cause changes in the state of portions of the first and second thin film 3 and 4 making up the recording layer 5 to effect the recording. The above-mentioned material of the first and second thin film 3 and 4 is amorphous on rapid heating or quenching, and is crystallized on gradual cooling, depending on the heating temperature. Thus, the information is recorded on forming an amorphous portion and a crystalline portion.

On the other hand, for reproducing the information on the optical disc of the present embodiment, the laser light, for example, that will not produce changes in the status, is illuminated from the substrate side to the recording layer 5 to detect the information based on the difference in the return light from the crystalline portion and that from the amorphous portion.

In the optical disc of the present embodiment, in which the recording layer 5, adapted for recording or erasing the information by reversibly changing its state between the crystalline state and the amorphous state, is made up of the first thin film 3 and the second thin film 4 having different crystallization start temperatures, the recording/erasure characteristics are assured by the thin film having a higher crystallization start temperature, while the repetition durability is assured by the thin film having a lower crystallization start temperature.

If, in manufacturing an optical disc of the present embodiment in which one of the first thin film 3 or the second thin film 4 making up the recording layer 5 contains nitrogen or oxygen, and the recording layer 5 made up of the two thin films is formed after forming the first dielectric layer 2 by a method routinely used in the manufacture of this sort of the optical disc on the substrate 1, it is sufficient if one of the two thin films of the recording layer 5 is formed by sputtering in an argon gas atmosphere containing 15% or less of nitrogen or in an argon gas atmosphere containing 15% or less of oxygen, and if subsequently the second dielectric layer 6, reflective layer 7 and the protective layer 8 are sequentially formed by a method routinely used for the manufacture of this sort of the optical disc.

If the first thin film 3 towards the substrate 1 is to contain nitrogen or oxygen, it is sufficient if the first thin film 3 is formed by sputtering in an argon gas atmosphere containing 15% or less of nitrogen or in an argon gas atmosphere containing 15% or less of oxygen.

EXAMPLES

For confirming the effect of the present invention, optical discs were actually manufactured and investigations were conducted into the repetition recording durability of these discs.

Preparation of Samples
Preparation of Inventive Sample 1

First, a substrate formed of a polycarbonate resin 0.6 mm thickness was prepared, and a first dielectric layer, 100 nm thickness, containing 20 mol % of SiO$_2$, was formed thereon by high-frequency sputtering, referred to hereinafter as RF sputtering, on a major surface of the polycarbonate substrate.

The first thin film of the recording layer then was formed. Here, using a target of $Ag_8In_6Sb_{58}Te_{28}$, an argon gas containing 7.5% of nitrogen was caused to flow in a vacuum device at a flow velocity of 70 sccm. In this condition, dc sputtering was carried out, under a total gas pressure of $4 \times 10^{-3}$ Torr, to form a first thin film 20 nm thickness on the first dielectric layer.

The second thin film of the recording layer then was formed. Here, using a target of $Ag_8In_6Sb_{58}Te_{28}$, an argon gas alone was caused to flow in a vacuum device at a flow velocity of 70 sccm. In this condition, dc sputtering was carried out, under a total gas pressure of $4 \times 10^{-3}$ Torr, to form the second thin film 8 nm thickness as a recording film on the first dielectric layer.

As the resulting assembly was kept in the vacuum state, a second dielectric layer, 35 nm thickness, containing 20 mol % of $SiO_2$, was formed on the recording layer by RF sputtering. On the second dielectric layer was formed a reflecting layer of Al—Ti, 120 nm thickness, to provide an inventive sample 1.

The crystallization start temperature of the first thin film of the first recording layer of the inventive sample 1 was approximately 220° C., while that of the second thin film was approximately 190° C.

These crystallization start temperatures were measured in the following manner. That is, the respective thin films were also formed on slide glass samples, provided separately, at the same time as these thin films were formed on the substrate, and measurements were made of the crystallization start temperatures of the thin films formed on these slide glass samples. As a device for measuring the crystallization start temperature, such a device was used which was provided with an infra-red heating oven having a temperature control finction and a measuring unit for measuring the reflectivity of the sample arranged in the infra-red heating oven with respect to the laser light with a wavelength of 780 nm. In the infra-red heating oven were placed the slide glass samples carrying thin films similar to the respective thin films. The temperature was raised at a rate of 20° C. per minute and changes in the reflectivity level at this time were checked.

The temperature at which the reflectivity level is abruptly changed due to change from the amorphous state to the crystalline state was measured as the crystallization start temperature, as discussed above.

Preparation of Inventive Sample 2

Then, a second inventive sample 2 was prepared in the same manner as the above-mentioned inventive sample 1, except that the atmospheric gas used when producing the first thin film forming the recording layer by the dc sputtering was changed to an argon gas containing 5% of nitrogen, the thickness of the first thin film was changed to 3 nm and the thickness of the second thin film is changed to 25 nm.

The crystallization start temperatures of the first thin film and the second thin film making up the recording layer of the inventive sample 2 were approximately 210° C. and approximately 190° C., respectively.

Preparation of Inventive Sample 3

Then, a third inventive sample 3 was prepared in the same manner as the above-mentioned inventive sample 1, except that the atmospheric gas used when producing the first thin film forming the recording layer by the dc sputtering was changed to an argon gas containing 4% of oxygen.

The crystallization start temperatures of the first thin film and the second thin film making up the recording layer of the inventive sample 2 were approximately 210° C. and approximately 190° C., respectively.

Preparation of Inventive Sample 4

Then, a fourth inventive sample 4 was prepared in the same manner as the above-mentioned inventive sample 1, except that the atmospheric gas used when producing the first thin film forming the recording layer by the dc sputtering was changed to an argon gas containing 5% of nitrogen, the thickness of the first thin film was changed to 25 nm and the thickness of the second thin film was changed to 3 nm.

The crystallization start temperatures of the first thin film and the second thin film making up the recording layer of the inventive sample 2 were approximately 210° C. and approximately 190° C., respectively.

Preparation of Comparative Sample 1

First, a substrate formed of a polycarbonate resin 0.6 mm thickness was prepared and a first dielectric layer 100 nm thickness containing 20 mol % of $SiO_2$ was formed by RF sputtering on a major surface of the substrate.

A recording layer then was formed. Here, using a target of $Ag_8In_6Sb_{58}Te_{28}$, an argon gas alone was caused to flow in a vacuum device at a flow velocity of 70 sccm. In this condition, dc sputtering was carried out, under a total gas pressure of $4 \times 10^{-3}$ Torr, to form a recording film 28 nm thickness.

As the resulting assembly was kept in the vacuum state, a second dielectric layer, 35 nm thickness, containing 20 mol % of $SiO_2$, was formed on the recording layer by RF sputtering. On the second dielectric layer was formed a reflecting layer of Al—Ti, 120 nm thickness, to provide a comparative sample 1.

The crystallization start temperature of the comparative sample 1 was approximately 220° C.

Figure 2:
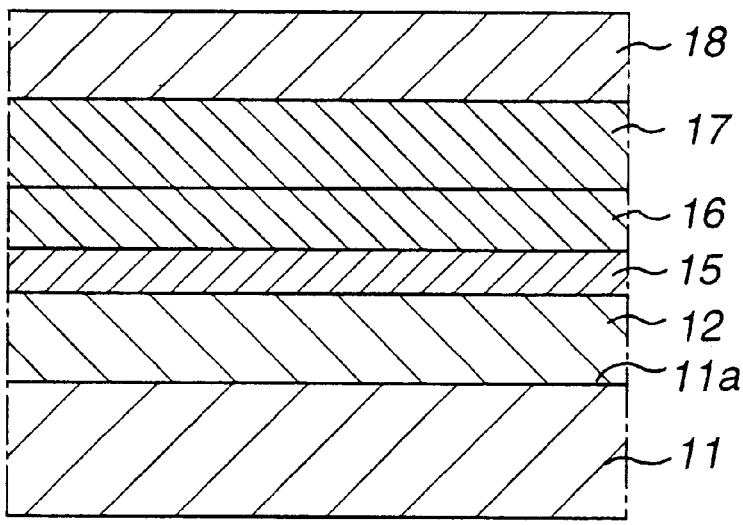
FIG. 2 is a schematic cross-sectional view showing the structure of the optical recording medium.

Specifically, the comparative sample 1 includes a first dielectric layer 12 on a major surface 11a of a disc-shaped substrate 11, and a recording layer 15, a second dielectric layer 16 and a reflecting layer 17 are layered thereon in this order, as shown in FIG. 2. If necessary, a protective layer 18 may be formed on the reflective layer 17.

Preparation of Comparative Sample 2

A comparative sample 2 was prepared in the same way as the comparative sample 1 except that the atmospheric gas when forming the recording layer by the dc sputtering was changed to an argon gas.

The crystallization start temperature of the comparative sample 2 was approximately 190° C.

Investigations Into Repetition Recording Durability

Then, the repetition recording durability of the inventive samples 1 to 4 and the comparative samples 1, 2 was checked by the following method. That is, using an evaluation unit, having an optical system with a wavelength of 680 nm and a numerical aperture of 0.6, a linear velocity of 4.8 m/sec and a recording power equal to the optimum power in each sample, random EFM signals were repeatedly recorded/reproduced. The standard deviation of each mark edge with respect to the clock normalized by the window width, was checked as jitter. Under this condition, error correction is possible if the jitter is not larger than 15%. In this regard, the case of the jitter not larger than 15% is evaluated as giving satisfactory repetition recording durability.

Figure 3:
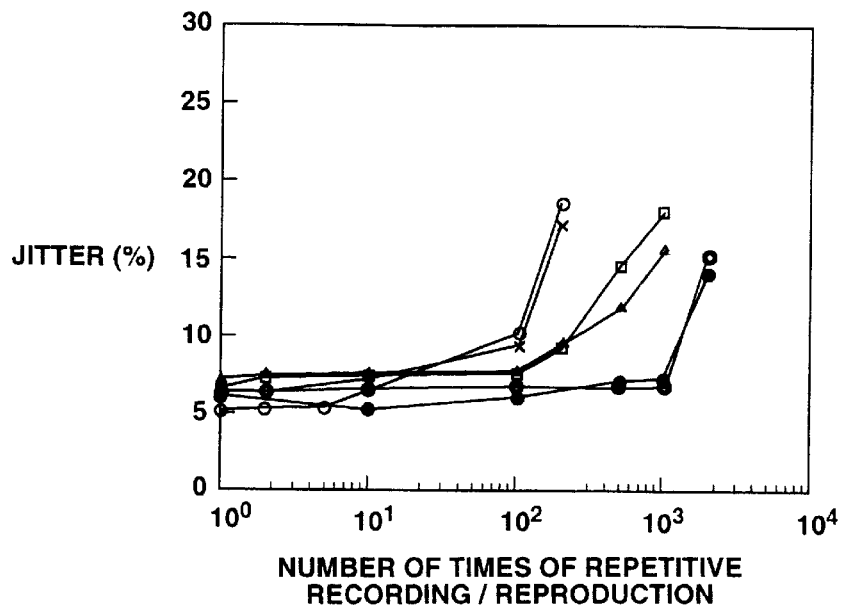
FIG. 3 is a graph showing the relation between the number of times of repeated recording/reproduction and the jitter.

FIG. 3 shows the relation between the number of times of repeated recording/reproduction of each sample and the jitter. In FIG. 3, ●, ▲, ⊙, □, ○ and × stand for the results of the inventive samples 1 to 4 and the comparative samples 1 and 2, respectively.

It is seen from the results of FIG. 3 that the inventive samples 1 to 4, having the recording layers formed by two thin films of different crystallization start temperatures, can stand repeated recording/reproduction over 100 times to exhibit sufficient repetition recording durability, whereas the comparative samples 1 and 2, having the recording layers formed by sole thin films, can be repeatedly recorded/reproduced only about 100 times.

Meanwhile, the inventive samples 1 and 3 can stand 2000 times or more of repeated recording/reproduction, whereas the inventive samples 2 and 4 can stand 500 times or more of repeated recording/reproduction.

It is also seen from the results of the inventive samples 1 to 4 that sufficient repetition recording durability is assured if the thickness of each of the two thin films making up the recording layer is not less than 3 nm.

It is likewise seen from the result of the inventive sample 3 that, if oxygen is contained in place of nitrogen in the thin films making up the recording layer, the crystallization start temperature can be changed to contribute to improved repetition recording durability.

It is moreover seen from the results of the inventive samples 1 to 4 that, if sputtering is carried out using an argon gas containing not less than 5% of nitrogen or oxygen, the crystallization start temperature of the thin films making up the recording layer can be changed to contribute to improved repetition recording durability.

It is further seen from the results of the comparative samples 1 and 2 that the jitter value is lower with the comparative sample 1 having a higher crystallization start temperature.

The following phenomenon accounts for the above findings. That is, if nitrogen or oxygen is contained in the thin films making up the recording layer, the crystallization start temperature is raised to improve the modulation factor as well as to reduce the crystal grain size to produce low jitter characteristics. This gives sufficient signal characteristics and recording durability in high linear speed and high recording density as in the present embodiment, while assuring recording and erasure characteristics representing crucial properties required of the overwrite memories. If nitrogen or oxygen is not contained as described above, repetition durability, representing crucial properties, required of the overwrite memories, is assured.

If, in accordance with the present invention, the above two layers are layered together to serve as a recording layer, it is possible to lower the jitter value on a whole, while it is possible to assure repetition durability. Moreover, during repeated recording/reproduction, nitrogen or oxygen contained in the thin film is diffused into the thin films not containing these elements to prevent the jitter from being increased following repeated recording/reproduction. The result is the improved repetition recording durability of the inventive samples 1 to 4.

Although the crystallization start temperature can be modified if nitrogen or oxygen is contained in the thin films making up the recording layer as described above, it is retained to be necessary to search into the possible upper limit of the nitrogen or oxygen content in view of the characteristics of the optical recording medium. Thus, the upper limit of the nitrogen or oxygen content is now considered.

Specifically, thin films were prepared with variable amounts of the nitrogen in the sputtering gas at the time of forming the thin films making up the recording layer, and the relation between the content of the nitrogen gas in the sputtering gas and the crystallization start temperature as well as the relation between the content of the nitrogen gas in the sputtering gas and reflectivity was checked. The results are shown in FIG. 4, in which the abscissa denotes the nitrogen gas content (%), the ordinate denotes the crystallization start temperature and the groove reflectivity (V), ● denotes the crystallization start temperature and Δ denotes groove reflectivity.

Figure 4:
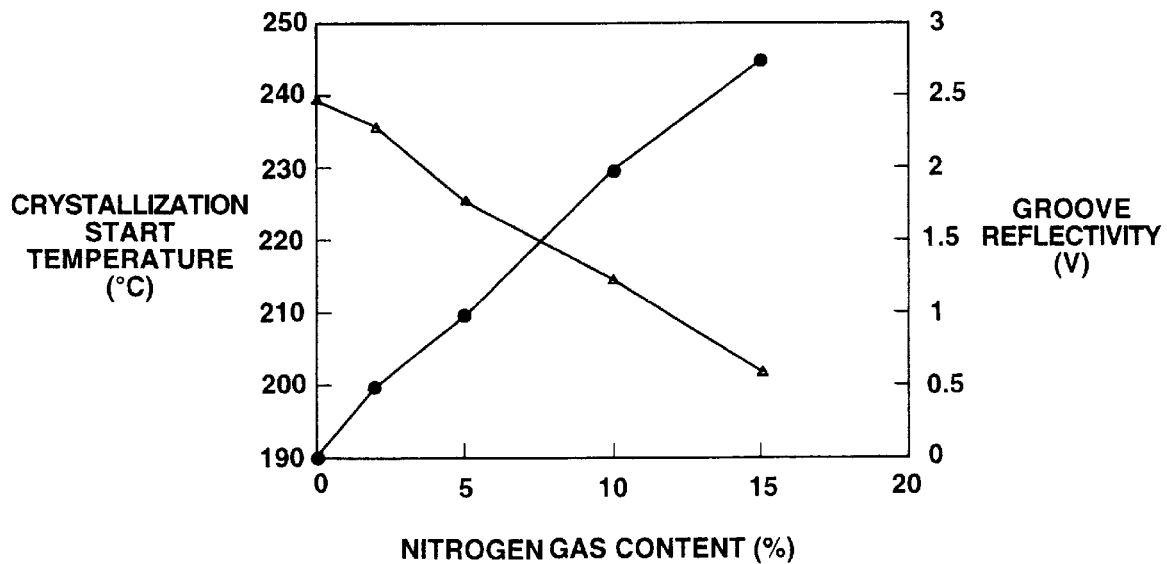
FIG. 4 is a graph showing the relation between the nitrogen gas content, crystallization start temperature and the groove reflectivity.
Figure 5:
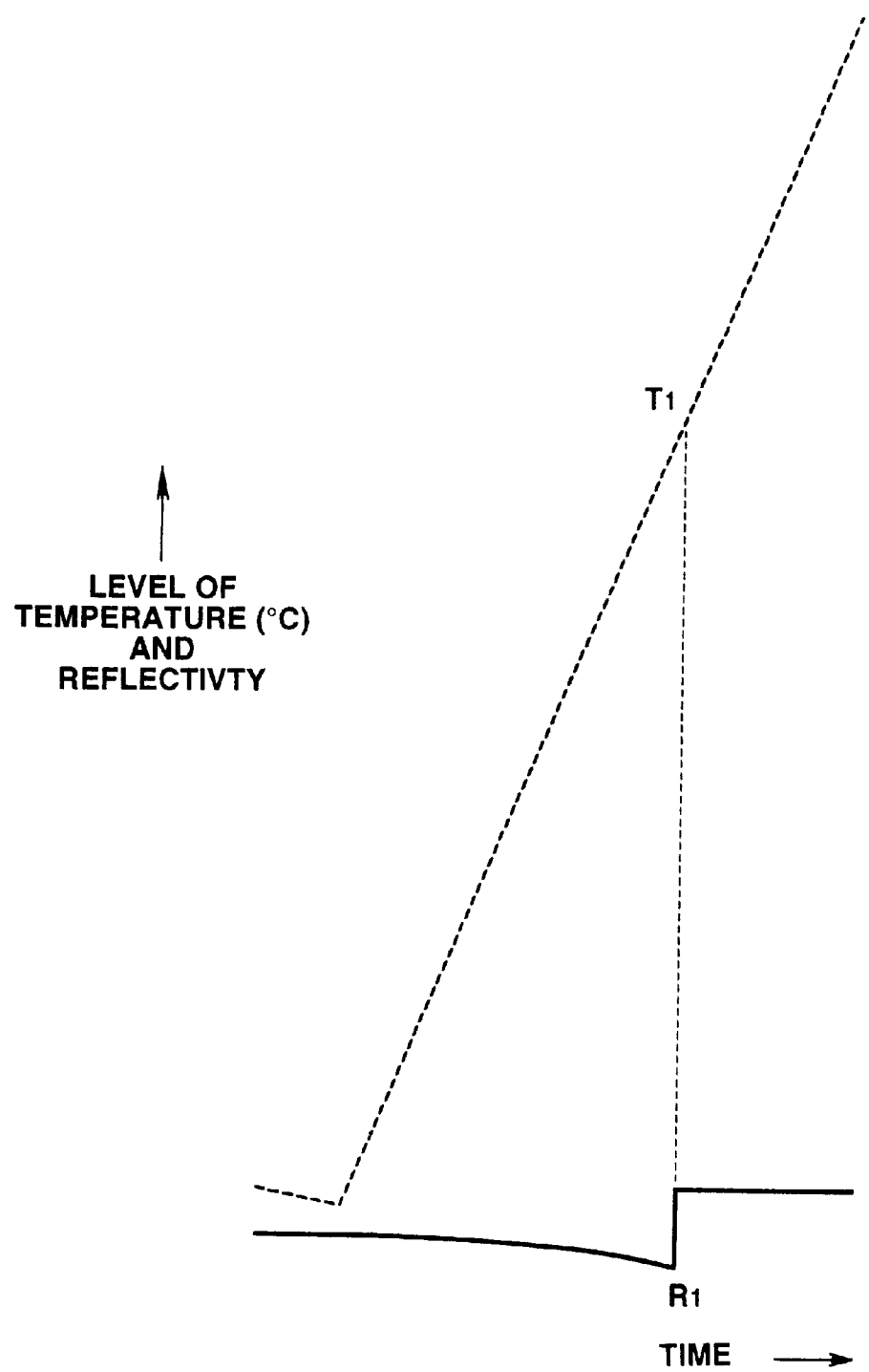
FIG. 5 is a graph showing the relation between the time on one hand and the temperature and the reflectivity level on the other hand.

It is seen from the results of FIG. 4 that the larger the nitrogen content in the sputtering gas, the higher is the crystallization start temperature. The higher crystallization start temperature is desirable since this gives satisfactory jitter characteristics. However, as also seen in FIG. 4, the larger the nitrogen content in the sputtering gas, the lower is the groove reflectivity. In this sort of the optical recording medium, servo signals need to be used in a certain amount. In this consideration, the nitrogen content in the sputtering gas is preferably not larger than 15%.

What is claimed is:

1. An optical recording medium comprising:

at least a first dielectric layer, a recording layer, a second dielectric layer, and a reflective layer layered on a substrate;

wherein said recording layer is reversibly changeable from a crystalline state to an amorphous state or vice versa for recording and/or erasing information;

wherein said recording layer comprises two thin films having different crystallization start temperatures; and wherein a first of said two thin films of said recording layer lying towards said substrate has a crystallization start temperature higher by 20° C. or more than that of a second of said two thin films of said recording layer.

2. The optical recording medium according to claim 1 wherein one of the thin films making up the recording layer contains nitrogen or oxygen.

3. The optical recording medium according to claim 2 wherein that one of the two thin films of the recording layer lying towards the substrate contains nitrogen or oxygen.

4. The optical recording medium according to claim 1 wherein the difference of the crystallization start temperatures of the two thin films of the recording layer is 20° or more.

5. The optical recording medium according to claim 1 wherein the thickness of each of the two thin films of the recording layer is 3 nm or more.

6. The optical recording medium according to claim 1 wherein the two thin films of the recording layer are formed of an Ag—In—Sb—Te based material.

7. A method for producing an optical recording medium by layering at least a first dielectric layer, a recording layer formed by two thin films exhibiting different crystallization start temperatures, a second dielectric layer and a reflective layer are layered on a substrate, wherein the improvement comprises:

forming one of said two thin films of the recording layer by sputtering under an atmosphere of argon containing not more than 15% of nitrogen or under an atmosphere containing not more than 15% of oxygen.

* * * * *